United States Patent
Thiesse et al.

(10) Patent No.: US 10,724,887 B2
(45) Date of Patent: Jul. 28, 2020

(54) PAVER MATERIAL FEED SYSTEM SENSOR MOUNTING

(71) Applicant: Caterpillar Paving Products Inc., Brooklyn Park, MN (US)

(72) Inventors: Chad M. Thiesse, Brooklyn Park, MN (US); Rick L. Mings, Oak Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 10 days.

(21) Appl. No.: 16/109,399

(22) Filed: Aug. 22, 2018

(65) Prior Publication Data

US 2020/0064174 A1 Feb. 27, 2020

(51) Int. Cl.
| | |
|---|---|
| *G01F 15/18* | (2006.01) |
| *E01C 19/48* | (2006.01) |
| *F16M 13/02* | (2006.01) |
| *G01F 1/66* | (2006.01) |

(52) U.S. Cl.
CPC .............. *G01F 15/18* (2013.01); *E01C 19/48* (2013.01); *F16M 13/022* (2013.01); *E01C 2301/14* (2013.01); *G01F 1/662* (2013.01)

(58) Field of Classification Search
CPC ....... E01C 19/48; E01C 2301/14; G01F 15/18
See application file for complete search history.

(56) References Cited

U.S. PATENT DOCUMENTS

| | | | |
|---|---|---|---|
| 3,967,912 A | 7/1976 | Parker | |
| 4,823,366 A | 4/1989 | Williams | |
| 4,933,853 A * | 6/1990 | Musil | E01C 19/006 37/382 |
| 4,948,292 A | 8/1990 | Haven et al. | |
| 5,452,966 A * | 9/1995 | Swisher, Jr. | E01C 19/48 404/108 |
| 5,975,473 A * | 11/1999 | Haas | E01C 19/006 172/4 |
| 6,244,782 B1 * | 6/2001 | Bitelli | E01C 19/48 198/841 |
| 6,729,596 B2 | 5/2004 | Gilabert | |
| 9,004,811 B2 | 4/2015 | Mings et al. | |
| 9,932,714 B2 | 4/2018 | Graham et al. | |
| 2009/0087263 A1* | 4/2009 | Martinez | E01C 23/166 404/94 |
| 2012/0234992 A1* | 9/2012 | Vanover | F16M 11/046 248/201 |

(Continued)

OTHER PUBLICATIONS

"Photo of Device Attached to Vogele Super 1880L.", Sep. 27, 2017 (1 page.).

*Primary Examiner* — Abigail A Risic
(74) *Attorney, Agent, or Firm* — Schwegman, Lundberg & Woessner (57) ABSTRACT

A paver material feed sensing system for a paving machine can comprise a sensor, sensor bracket, swivel assembly and mounting post. The sensor bracket can comprise an adjustable socket for receiving the sensor. The mounting post can comprise a first end coupled to the swivel assembly and a mounting slot located in a second end. The mounting slot can comprise a multi-faceted seat for engaging an edge of a plate of the paving machine. A method of positioning a paver material flow sensor can comprise tilting the mounting post on the plate of the paving machine.

20 Claims, 5 Drawing Sheets

(56) References Cited

U.S. PATENT DOCUMENTS

| | | | |
|---|---|---|---|
| 2013/0223927 A1* | 8/2013 | Mings | G01S 15/88 404/72 |
| 2014/0086684 A1* | 3/2014 | Sehr | G01D 21/02 404/84.05 |
| 2014/0099165 A1* | 4/2014 | Smieja | E01C 19/48 404/72 |
| 2016/0024725 A1* | 1/2016 | Frelich | E01C 19/48 404/72 |
| 2017/0292230 A1 | 10/2017 | Herzberg | |

* cited by examiner

PAVER MATERIAL FEED SYSTEM SENSOR MOUNTING

TECHNICAL FIELD

The present application relates generally, but not by way of limitation, to sensor mounting systems and methods for paving machines, such as those that can be used for paving asphalt roads. More particularly, the present application relates to adjustable mounting assemblies for sensors that can be used in paver material feed and sensing systems and methods.

BACKGROUND

Road paving machines can utilize multiple sensor systems to assist in pouring and spreading paving material to form a new roadway surface or mat. For example, road paving machines can utilize sensors to determine road grade, material depth and material feed levels. Because each roadway being produced can have different parameters, such as thickness and width, it can be advantageous to adjust the position of various sensors for a particular project to better sense the desired parameter. There are, however, a limited number of locations on the paving machine where sensors can be mounted to accurately determine the desired parameter with a reduced risk of being damaged.

U.S. Pat. No. 4,948,292 to Haven et al., entitled "Paving Machine Having Transversely and Longitudinally Adjustable Grade Sensors," discloses "standard grade sensor mounting assembly 80" that can be "attached to the support plates 78" using "vertical sensor support 81" and "horizontal sensor support 82."

SUMMARY OF THE INVENTION

A paver material feed sensing system for a paving machine can comprise a sensor, a sensor bracket, a swivel assembly and a mounting post. The sensor can be configured to directionally emit a sensing signal. The sensor bracket can comprise an adjustable socket for receiving the sensor. The swivel assembly can be coupled to the sensor bracket and can be configured to rotate the sensor about a swivel axis. The mounting post can comprise a first end coupled to the swivel assembly, a second end, and a mounting slot located in the second end. The mounting slot can comprise a multi-faceted seat for engaging an end surface of a plate of the paving machine.

A method of positioning a paver material flow sensor for a paver material feed system can comprise sliding a mounting slot of a mounting post of an adjustable mounting assembly onto a side plate of the paver material feed system, sliding the mounting post at the mounting slot along the side plate into a position forward, alongside or rearward of an auger of the paver material feed system, tilting the mounting post at the mounting slot on the side plate in a forward or rearward direction and adjusting the adjustable mounting assembly so that the material flow sensor is angled at an angle to a rotation axis of the auger.

DETAILED DESCRIPTION

Figure 1:
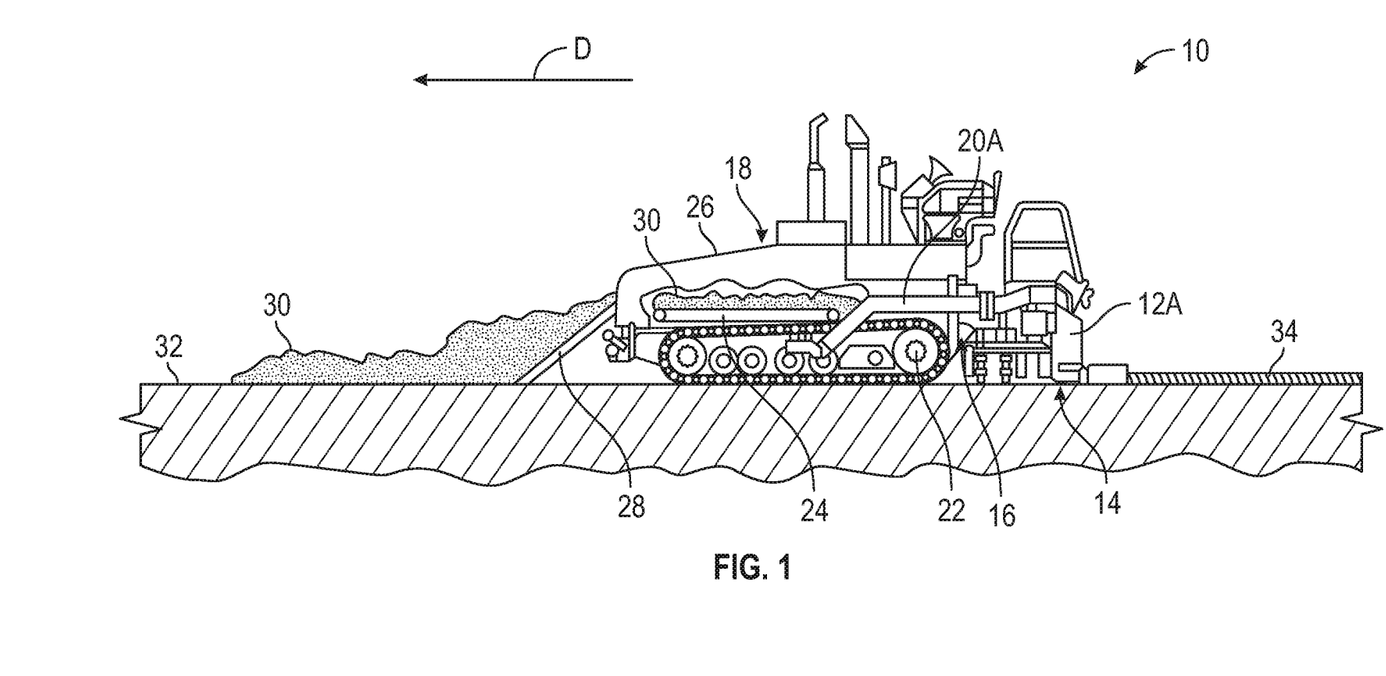
FIG. 1 is a schematic side view of an asphalt paving machine showing a screed system positioned relative to an auger system.
Figure 2:
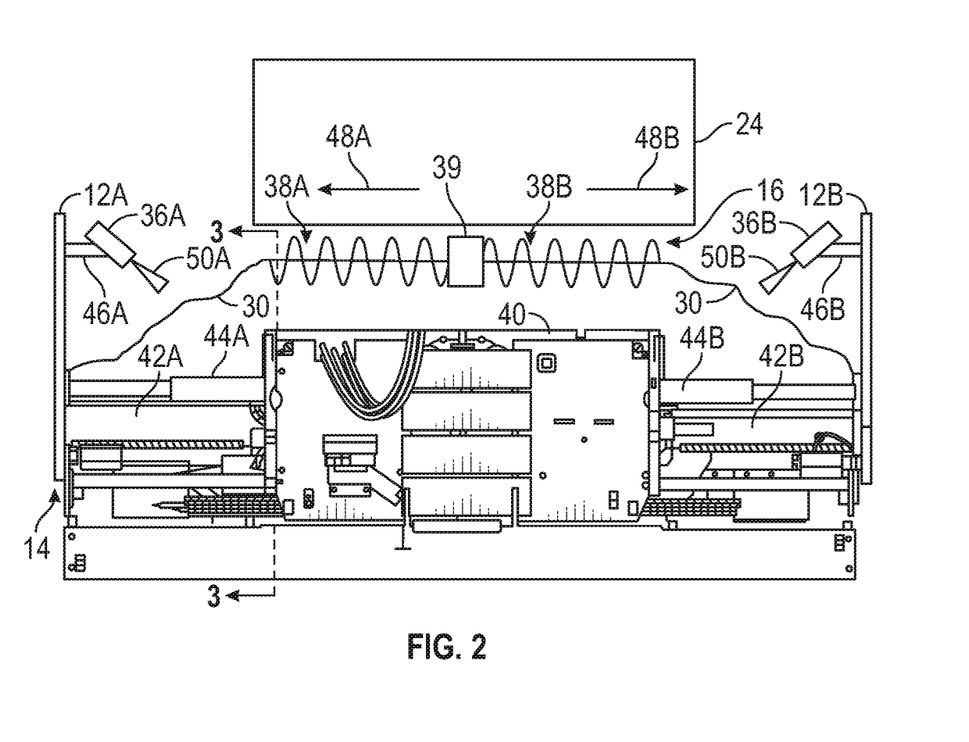
FIG. 2 is a diagrammatic plan view of a paving material teed sensing system of the asphalt paving machine of FIG. 1 showing material flow sensors positioned relative to an auger and a screed extender.

FIG. 1 is a schematic side view of asphalt paving machine 10 showing screed side plate 12A of screed system 14 positioned rearward of auger system 16. Asphalt paving machine 10 can comprise vehicle portion 18, which can be connected to screed system 14 via tow arm 20A. As shown in FIG. 2, paving machine 10 can additionally comprise side plate 12B. A second tow arm 20B (not shown can also be provided. Vehicle portion 18 can additionally comprise propulsion element 22, conveyor system 24, hopper 26 and elevator 28.

Loose paving material 30 can be deposited onto work surface 32 via a dump truck or other suitable means. Paving machine 10 can include means for moving loose paving material 30 into hopper 26, such as elevator 28. Paving material 30 can be asphalt, aggregate materials or concrete. In various embodiments, paving material 30 can be deposited directly into hopper 26 of paving machine 10. Paving machine 10 can travel in direction D, while conveyor system 24 can move paving material in the opposite direction from hopper 26 to auger system 16.

Conveyor system 24 can be disposed within or below hopper 26. Conveyor 26 can transport loose paving material 30 through vehicle portion 18 toward auger system 16. A grading implement, such as screed system 14, can be attached to the rear of vehicle portion 18 to receive paving material 30 from auger system 16. Screed system 14 can be towed by tow arms 20A and 20B, only one of which is shown in FIG. 1. Propulsion system 22 can comprise a ground engaging element, such as an endless track as shown in FIG. 1, wheels or the like for propelling paving machine 10 along work surface 32. Loose paving material 30 can be deposited by conveyor system 24 in front of auger system 16. Auger system 16 can disperse loose paving material 30 along the width (into the plane of FIG. 1) of screed system 14. Screed system 14 can compact loose paving material 30 into mat 34 behind paving machine 10.

In order to facilitate formation of mat 34, paving machine 10 can be outfitted with a plurality of different sensor systems to monitor operation of conveyor system 24, auger system 16 and screed system 14. Paving machine 10 can be equipped with material flow sensors 36A and 36B (FIG. 2) to monitor flow of paving material 30 from auger system 16 relative to screed system 14. For example, sensors can be positioned to monitor whether or not paving material 30 is being adequately distributed across the width of screed system 14 by auger system 16 between side plates 12A and 12B.

FIG. 2 is a diagrammatic plan view of a paving material teed sensing system of asphalt paving machine 10 of FIG. 1 showing material flow sensors 36A and 36B positioned relative to augers 38A and 38B of auger system 16 and side plates 12A and 12B of screed system 14. Side plates 12A and 12B can be connected to main housing 40 via screed extenders 42A and 42B. The position of screed extenders 42A and 42B can be adjusted relative to main housing 40 by actuators 44A and 44B, respectively. Material flow sensors 36A and 36B can be attached to side plates 12A and 12B, respectively, by adjustable mounting assemblies 46A and 46B. First and second material flow sensors 36A and 36B and first and second adjustable mounting assemblies 46A and 46B can be connected to a controller (not shown) for paving machine 10 and together can comprise a paver material feed sensing system.

Paving material 30 can be pushed laterally outward in opposite first and second directions 48A and 48B, as indicated by arrows. Augers 38A and 38B, which can comprise two sections of auger rotating in opposite directions via gearbox 39, can be rotated at a suitable speed to provide enough paving material to extend the full width between side plates 12A and 12B, and to provide mat 34 (FIG. 1) with sufficient thickness. As such, an operator of asphalt paving machine 10 can enter operator inputs for a target head (or height) of paving material 30 in front of screed system 14 to control the speed of augers 38A and 38B and the speed of conveyor system 24 based on a distance paving material 30 is away from sensors 36A and 36B. In various embodiments, it can be advantageous to ensure that constant live flow of paving material 30 reaches all the way to side plates 12A and 12B so that a constant, continuous flow of paving material 30 is provided to screed extenders 42A and 42B and mat 34 will be uniform across its width. Material flow sensors 36A and 36B can sense if too much or too little paving material 30 is being delivered in front of screed extenders 42A and 42B, and can, with a controller, adjust speed of augers 38A and 38B accordingly to maintain material feed head (height) targets.

Material flow sensors 36A and 36B can be mounted to side plates 12A and 12B, respectively, to monitor flow of paving material 30 to side plates 12A and 12B. Adjustable mounting assemblies 46A and 46B can be adjustable so that material flow sensors 36A and 36B can accurately sense or detect paving material 30. Because actuators 44A and 44B can change the distance between auger 38 and side plates 12A and 12B, the angle at which material flow sensors 36A and 36B accurately sense the flow of paving material 30 can also change. In various examples, material flow sensors 36A and 36B can be acoustic sensors, sonic sensors, laser sensors and the like, or other distance, level, proximity or presence sensors. In an example, material flow sensors 36A and 36B can comprise sonic sensors that send out signals 50A and 50B toward paving material 30. Signals 50A and 50B can bounce of paving material 30 and return to material flow sensors 36A and 36B, respectively, whereby material flow sensors 36A and 36B can, in conjunction with a controller, determine or sense if head of paving material 30 is at the target setting. If paving material 30 is not detected or an insufficient amount of paving material 30 is detected, an operator of asphalt paving machine 10 can increase the speed of auger 38 to provide additional paving material 30 to screed extenders 42A and 42B. The speed of conveyor system 24 can additionally be adjusted accordingly.

Signals 50A and 50B can be pulsed in a directional orientation such that signals 50A and 50B travel along generally linear paths. Ideally, one-hundred-percent of pulsed signals 50A and 50B are reflected back to sensors 36A and 36B, such as when surfaces against Which they impact are parallel to the directional orientation. However, if the surface against which signals 50A and 50B impact are not parallel to the directional orientation, some of the pulses of signals 50A and 50B may not reflect back to sensors 36A and 36B. Thus, it can be desirable to ensure that sufficient proportions of signals 50A and 50B are returned, e.g., reflected, to material flow sensors 36A and 36B to improve signal accuracy. Adjustable mounting assemblies 46A and 46B can be positioned on side plates 12A and 12B and adjusted relative to screed extenders 42A and 42B to improve detection of paving material 30 by increasing the amounts of signals 50A and 50B that are bounced back to material flow sensors 36A and 36B, respectively, such as by facilitating a perpendicular orientation between sensors 36A and 36B and the head of paving material 30.

Figure 3:
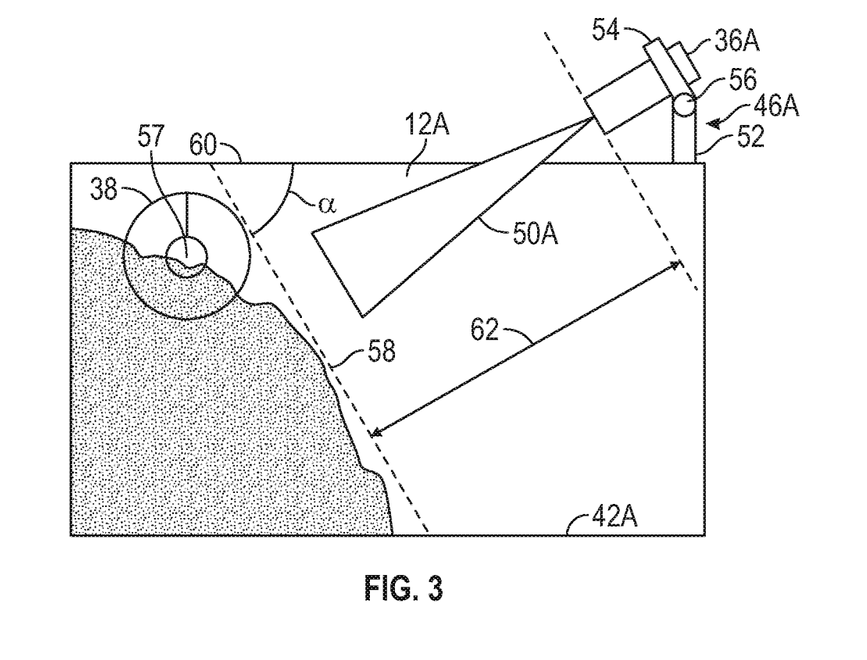
FIG. 3 is a diagrammatic side view of a material flow sensor of FIG. 2 mounted to a side plate of a screed extender and positioned relative to the auger and a flow of paving material.

FIG. 3 is a diagrammatic side view of material flow sensor 36A mounted to side plate 12A and positioned relative to auger 38A and flow of paving material 30 on screed extender 42A. Material flow sensor 36A can be mounted to side plate 12A by adjustable mounting assembly 46A. Adjustable mounting assembly 46A can comprise mounting post 52, sensor bracket 54 and swivel assembly 56. Rotation of auger 38A about auger axis 57 can push paving material 30 outward (out of the plane of FIG. 3), which can cause paving material 30 to mound upon screed extender 42A and form a surface of material extending generally along plane 58. Paving material 30 can form a face of live material wherein plane 58 forms angle α with end surface 60 of side plate 12A. In examples, plane 58 can form such that angle α is approximately forty-five degrees.

In order to improve the effectiveness of material flow sensor 36A, it can be advantageous to position material flow sensor 36A to emit signal 50A perpendicular to plane 58. Material flow sensor 36A can be positioned distance 62 away from plane 58. Additionally, it can be advantageous to position material flow sensor 36A such that distance 62 is within an effective range of material flow sensor 36A. In an example, the effective range of material flow sensor 36A is from approximately 12 inches (~30.5 cm) to approximately 32 inches (~81.3 cm), with approximately 18 inches (~45.7 cm) being a desirable distance.

Adjustable mounting assembly 46A can be configured to permit material flow sensor 36A to detect in specific orientations for different machines and different configurations of the same machine. Mounting post 52 can be coupled to side plate 12A along end surface 60. Sensor bracket 54 can slideably couple to material flow sensor 36A. Swivel assembly 56 can pivotably couple sensor bracket 54 and mounting post 52. Mounting post 52 is configured to be tilted to fleshly mount on end surface 60 in multiple positions to facilitate sensing at a perpendicular orientation to plane 58. For example, swivel axis 106 (FIG. 5) along which swivel assembly 56 can rotate relative to mounting post 52 can be angled at different circumferential positions relative to auger axis 57. Material flow sensor 36A can be slideably adjusted within sensor bracket 54 to facilitate sensing at a desirable distance 62 from plane 58. Swivel assembly 56 can provide additional degrees of freedom of movement.

Figure 4:
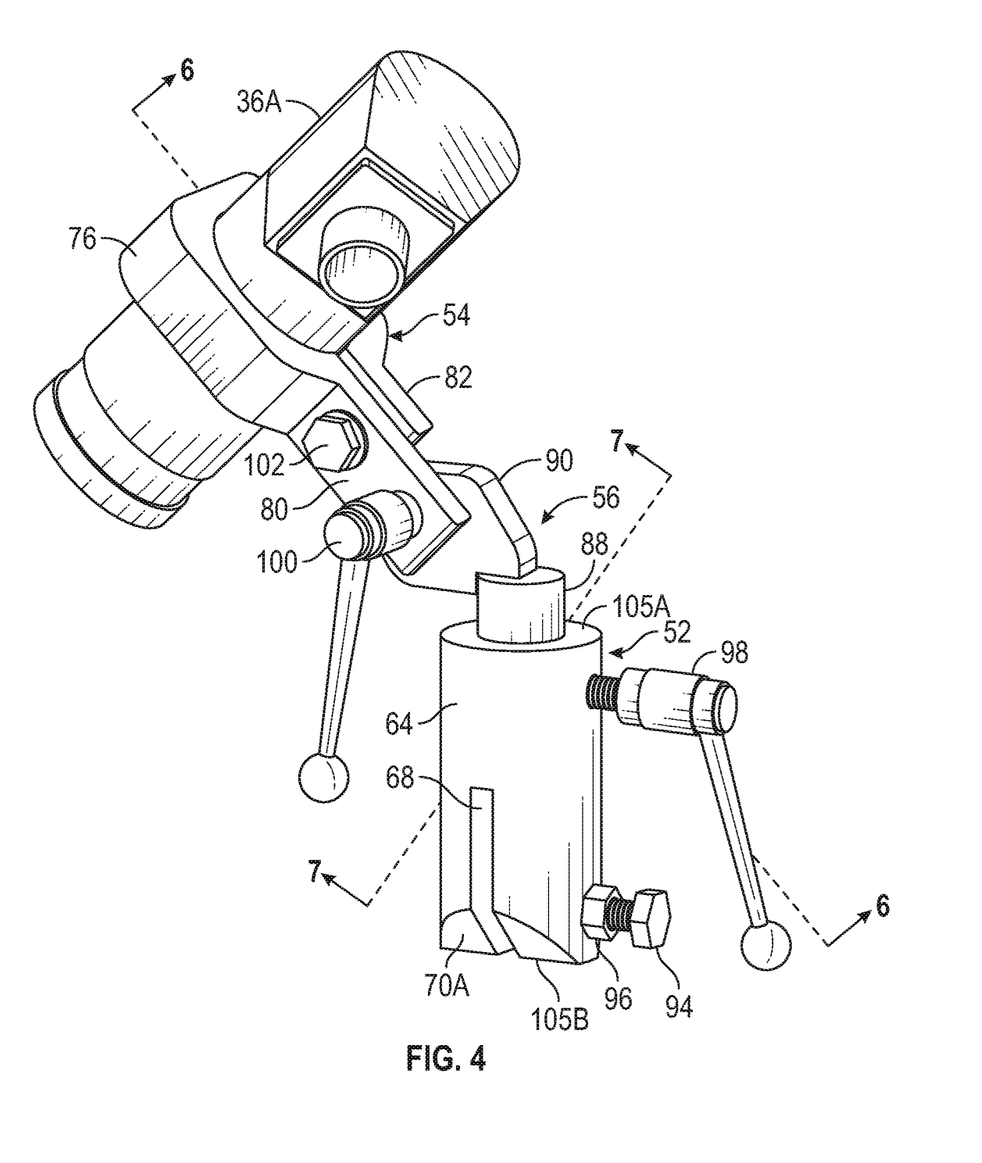
FIG. 4 is a perspective view of a material flow sensor and an adjustable mounting assembly comprising a mounting post, a sensor bracket and a swivel assembly.
Figure 5:
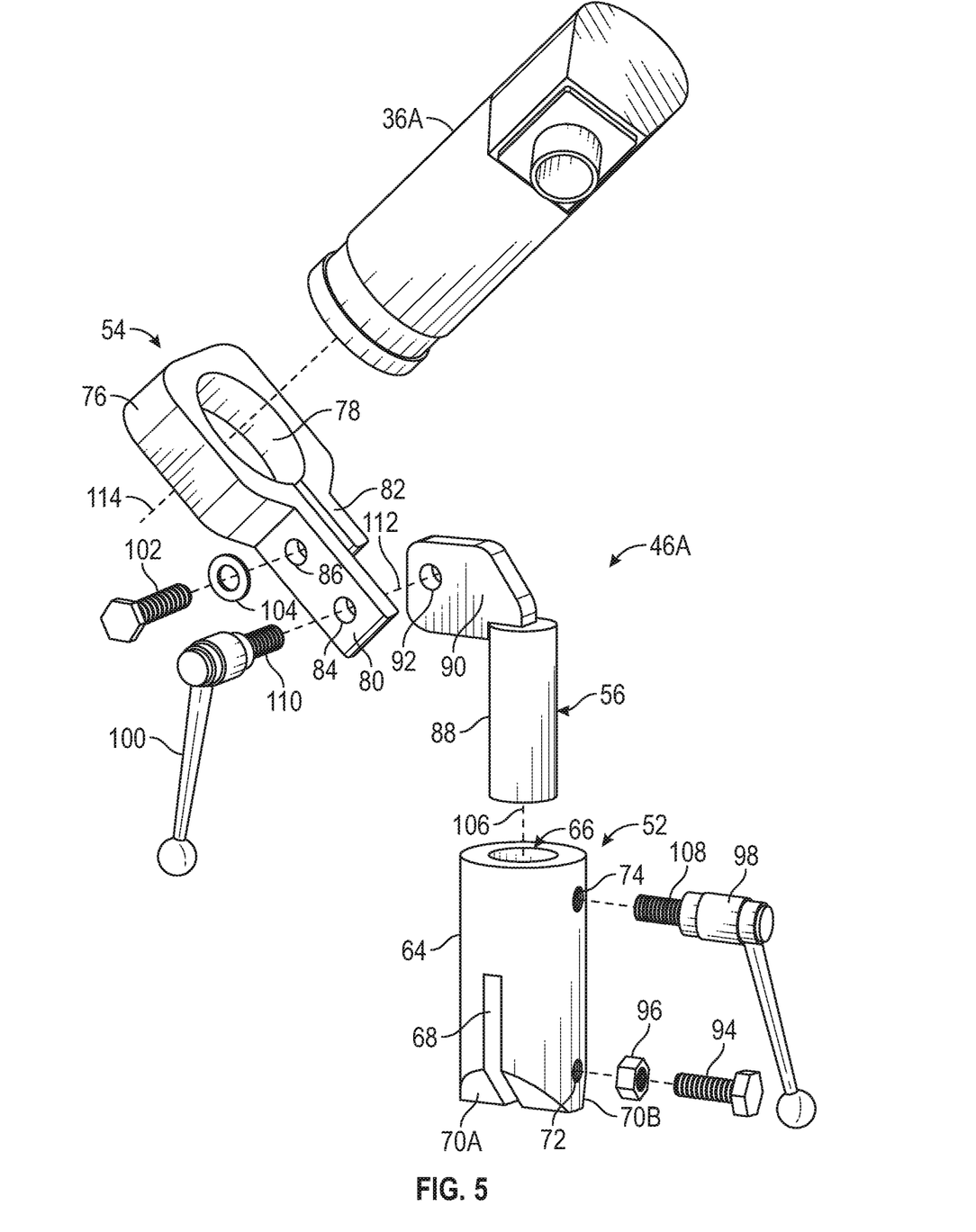
FIG. 5 is an exploded view of the material flow sensor and adjustable mounting assembly of FIG. 4.

FIG. 4 is a perspective view of first material flow sensor 36A and first adjustable mounting assembly 46A comprising mounting post 52, sensor bracket 54 and swivel assembly 56. FIG. 5 is an exploded view of first material flow sensor 36A and first adjustable mounting assembly 46A of FIG. 4. FIGS. 4 and 5 are discussed concurrently. Second material flow sensor 36B and second adjustable mounting assembly 46B can be configured similarly to first material flow sensor 36A and first adjustable mounting assembly 46A.

Mounting post 52 can comprise body 64, swivel socket 66, mounting slot 68, chamfers 70A and 70B, mount lock bore 72 and swivel lock bore 74. Sensor bracket 54 can comprise collar 76, socket 78, mount flange 80, clamp flange 82, mount bore 84 and clamp bore 86. Swivel assembly 56 can comprise stud 88, flange 90 and bore 92. Adjustable mounting assembly 46A can further comprise jam nut 94, jam fastener 96, swivel handle 98, pivot handle 100, lock fastener 102 and washer 104.

Mounting post 52 can comprise first end 105A and second end 105B. Second end 105B can be coupled to side plate 12A (FIGS. 2 and 3) by inserting end surface 60 of side plate 12A into mounting slot 68. Jam nut 96 can be connected to jam fastener 94 and jam fastener 94 can be connected to mount lock bore 72 to secure mounting post 52 to side plate 12A. The position of jam nut 96 along jam fastener 94 can be adjusted to adjust a mounting force. Stud 88 of swivel assembly 56 can be inserted into swivel socket 66 of mounting post 52 at first end 105A. Swivel socket 66 and stud 88 can comprise circular cross-sectional profiles to facilitate rotation of stud 88 within socket 66 along swivel axis 106. As such, the diameter of socket 66 can be slightly larger than the diameter of stud 88 to facilitate insertion and rotation. Stud 88 can additionally be extended from socket 66 along swivel axis 106 to extend sensor bracket 54 further away from mounting post 52. Stud 108 of swivel handle 98 can be connected to swivel lock bore 74, such as by a threaded engagement, to lock stud 88 into a rotational and axial position relative to swivel axis 106.

Flange 90 can be connected to stud 88 by any suitable means, such as fasteners or welding. Flange 90 can extend off to the side of swivel axis 106 to facilitate positioning of sensor bracket 54 about mounting post 52. Mount flange 80 of sensor bracket 54 can be coupled to flange 90 at mount bore 84 and bore 92 via pivot handle 100. Stud 110 of pivot handle 100 can be inserted through mount bore 84 and connected to bore 92, such as by a threaded engagement, to lock mount flange 80 into a rotational position relative to pivot axis 112. For example, flange 80 can become pinned between pivot handle 100 and flange 90 as stud 110 is tightened into bore 92.

The body or housing of material flow sensor 36A can be inserted into socket 78 of collar 76 of sensor bracket 54. Fastener 102 can be inserted through clamp bore 86 in mount flange 80 and connected to an aligned bore (not visible in FIGS. 4 and 5; See FIG. 6) in clamp flange 82. The aligned bore in clamp flange 82 can be threaded to mate with threading on lock fastener 102 so that mount flange 80 can be drawn toward clamp flange 82 to cinch collar 76 around material flow sensor 36A. As such, the diameter of collar 76 can be adjustable to fit with and lock against different sized sensors. Socket 78 formed by collar 76 can be smooth bored, or free of threading, such that material flow sensor 36A can be freely slid along sensor axis 114 within socket 78.

Figure 6:
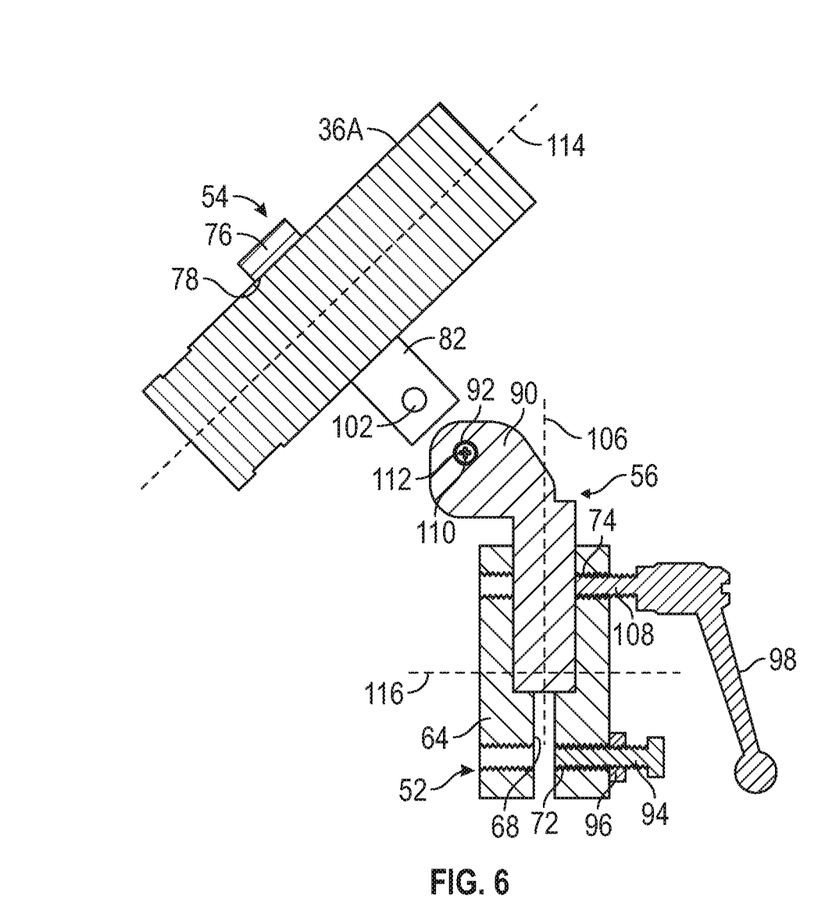
FIG. 6 is a cross-sectional view of the material flow sensor and adjustable mounting assembly of FIG. 4 taken at section 6-6 to show adjustability axes of the mounting assembly.

FIG. 6 is a cross-sectional view of material flow sensor 36A and adjustable mounting assembly 46A of FIG. 4 taken at section 6-6 to show adjustability axes of adjustable mounting assembly 46A that permit movement of material flow sensor 36A relative to side plate 12A with multiple degrees of freedom of movement. Material flow sensor 36A can be positioned by adjustable mounting assembly 46A relative to swivel axis 106, pivot axis 112, sensor axis 114 and tilt axis 116.

The body of material flow sensor 36A can be slid into any axial position along sensor axis 114 within sensor bracket 54. Clamping action provided by mount flange 80, clamp flange 82 and lock fastener 102 can immobilize material flow sensor 36A along sensor axis 114.

Sensor bracket 54 can be rotated to any circumferential position about pivot axis 112, being limited by the presence of stud 88 and mounting post 52. Rotation of sensor bracket 54 can be immobilized along pivot axis 112 by counter rotational force provided by stud 110 of pivot handle 100.

Stud 88 can be slid into any axial position along swivel axis 106 within mounting post 52 and rotated into any circumferential position about swivel axis 106 within mounting post 52. Sliding and rotation of stud 88 relative to mounting post 52 can be immobilized along swivel axis 106 by counter-force provided by stud 108 of swivel handle 98.

Mounting post 52 can be mounted to side plate 12A in a plurality of discrete positions relative to tilt axis 116 defined by mounting slot 68. Jam fastener 94 and jam nut 96 can immobilize pivoting of mounting post 52 along tilt axis 116.

Figure 7:
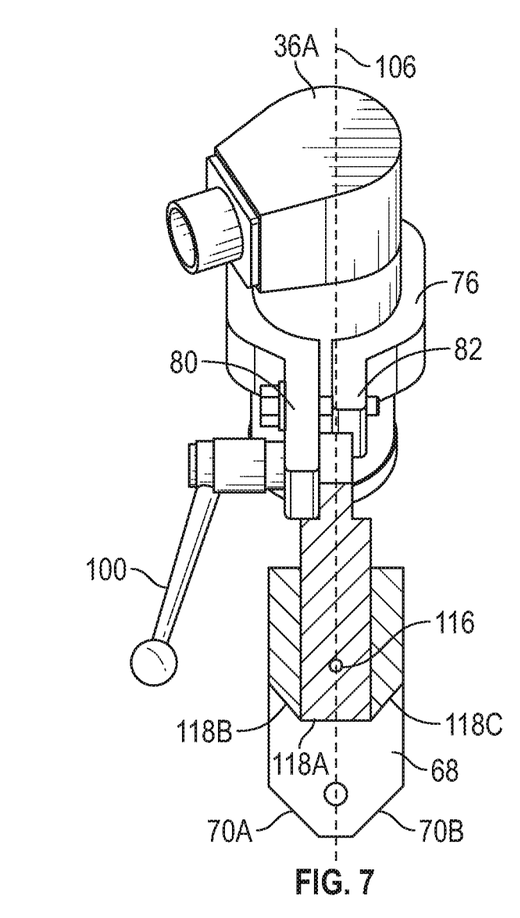
FIG. 7 is a cross-sectional view of the material flow sensor and adjustable mounting assembly of FIG. 4 taken at section 7-7 to show angled mounting facets of the mounting post of the adjustable mounting assembly.

FIG. 7 is a cross-sectional view of material flow sensor 36A and adjustable mounting assembly 46A of FIG. 4 taken at section 7-7 to show angled mounting facets 118A, 118B and 118C of mounting post 52 of adjustable mounting assembly 46A. Angled mounting facets 118A, 118B and 118C can together form a multi-faceted seat against which a mounting plate, such as side plate 124, can be engaged flush to firmly mount material flow sensor 364 to paver machine 10, thereby increasing the stability, positioning and, hence, accuracy of material flow sensor 36A.

First angled mounting facet 118A can be disposed perpendicular to swivel axis 106 at the inner or proximal end of mounting slot 68. First angled mounting facet 118A can be centered on swivel axis 106. Second angled mounting facet 118B and third angled mounting facet 118C extend from opposite sides or edges of first angled mounting facet 118A and can be angled upward or proximally toward swivel socket 66. In an example, first angled mounting facet 118A can form an angle of approximately ninety degrees with swivel axis 106 and second and third angled mounting facets 118B and 118C can form angles of approximately forty-five degrees with swivel axis 106. In other examples, angled mounting facets 118B and 118C can form angles in the range of approximately twenty-five to seventy-five degrees with swivel axis 106. Angled mounting facets 1184, 118B and 118C can permit mounting post 52 to seat against end surface 60 (FIG. 3) of side plate 12A at multiple discrete positions relative to tilt axis 116. Angled mounting facets 118A, 118B and 118C can provide a length of flat material of mounting post 52 within mounting slot 68 against which end surface 60 (FIG. 3) can flushly engage. As such, tilting of adjustable mounting assembly 46A need not be positioned on an edge of mounting slot 68 if tilted about tilt axis 116. Additionally, angled mounting facets 118A, 118B and 118C can be equidistant from tilt axis 116 so that sensor bracket 54 and swivel assembly 56 can be uniformly positioned for each of angled mounting facets 118A, 118B and 118C. Chamfers 70A and 70B can follow or mimic the path of angled mounting facets 118A, 118B and 118C. Accordingly, chamfers 70A and 70B can provide clearance for mounting of body 64 to minimize interference with other components of paving machine 10.

INDUSTRIAL APPLICABILITY

The disclosure of the present application is related to sensor mounting arrangements for paving machines. Properly mounted and oriented sensing equipment can facilitate more efficient road paving operations, thereby reducing waste and re-work. Paving machines can provide a limited number of locations for positioning material flow sensors in locations where the material flow sensor will not become damaged while still also being positioned to accurately read the paving material flow. For example, it can be advantageous to ensure that the paving material flow sensor emits a signal that is generally perpendicular to a major surface of paving material exiting an auger to, for example, assist in ensuring the sensor signal will return to the paving material flow sensor after bouncing off the paving material. Furthermore, it can be advantageous to position the paving material flow sensor a distance from that major surface to, for example, assist in ensuring the sensor signal will be strong enough and wide enough to sense in the desired location.

Previous adjustable mounting assemblies were limited in the ways that they can be adjusted. For example, some assemblies, though adjustable in the way the sensor can be positioned to a base of the assembly, were not adjustable in the way the base can be coupled to the paving machine or the way the sensor can be coupled to the assembly.

Adjustable mounting assemblies 46A and 46B of the present application can facilitate locating and adjusting of material flow sensors 36A and 36B, respectively, to assist in ensuring that material flow sensors 36A and 36B will not become damaged during operation of paving machine 10 and to assist in ensuring that an emitted sensor signal will properly engage a flow of paving material exiting augers 38A and 38B for different configurations or set-ups of the same paving machine. Material flow sensors 36A and 36B can be adjustably positioned within socket 78 to adjust the position of sensors 36A and 36B relative to sensor bracket 54. For example, socket 78 does not include a threaded engagement that locks sensor 36A into a single position in sensor bracket 54. Mounting post 52 can be adjustably coupled to side plates 12A and 12B to adjust the position of adjustable mounting assemblies 46A and 46B relative to paving machine 10. For example, body 64 of mounting post 52 is not limited to a single, flush engagement with end surface 60 of side plate 12A.

What is claimed is:

1. A paver material feed sensing system for a paving machine, the paver material feed sensing system comprising:
    a sensor configured to directionally emit a sensing signal;
    a sensor bracket comprising an adjustable socket for receiving the sensor;
    a swivel assembly coupled to the sensor bracket, the swivel assembly configured to rotate the sensor about a swivel axis; and
    a mounting post comprising:
        a first end coupled to the swivel assembly;
        a second end; and
        a mounting slot located in the second end, the mounting slot comprising opposing sidewalls and a multi-faceted seat between the sidewalls to engage an end surface of a plate of the paving machine,
    wherein the multi-faceted seat includes a plurality of surfaces that form an upper mounting surface of the mounting slot to engage the end surface of the plate of the paving machine.

2. The paver material feed sensing system of claim 1, wherein the plurality of surfaces that form the upper mounting surface of the multi-faceted seat include:
    a first surface extending approximately perpendicular to the swivel axis;
    a second surface extending from a first edge of the first surface at a first angle; and
    a third surface extending from a second edge of the first surface at a second angle.

3. The paver material teed sensing system of claim 2, wherein the first angle and the second angle are approximately forty-five degrees.

4. The paver material feed sensing system of claim 1, further comprising:
    an auger configured to extrude paving material about an auger axis;
    the plate comprising the end surface, the plate comprising a first surface disposed perpendicular to the auger axis, wherein the edge extends along the first surface;
    wherein the multi-faceted seat is configured to flushly engage the edge in a plurality of positions.

5. The paver material feed sensing system of claim 4, wherein the faceted seat includes facets that orient the swivel axis in different circumferential positions relative to the auger axis.

6. The paver material feed sensing system of claim 1, wherein the adjustable socket comprises:
    a collar that at least partially surrounds the sensor; and
    a clamp configured to cinch the collar around the sensor.

7. The paver material teed sensing system of claim 6, wherein the collar forms a smooth bore for slidably receiving the sensor.

8. The paver material feed sensing system of claim 6, wherein the collar has an adjustable diameter.

9. The paver material feed sensing system of claim 1, wherein the mounting post is chamfered at the second end along a path mimicking the multi-faceted seat.

10. The paver material feed sensing system of claim 1, further comprising a locking mechanism located on the mounting post configured to engage the plate to retain the mounting post against a surface of the multi-faceted seat.

11. A method of positioning a paver material flow sensor for a paver material feed system, the method comprising:
    sliding a mounting slot of a mounting post of an adjustable mounting assembly onto a side plate of the paver material feed system;
    sliding the mounting post at the mounting slot along the side plate into a position forward, alongside or rearward of an auger of the paver material feed system;
    tilting the mounting post at the mounting slot on the side plate in a forward or rearward direction; and
    adjusting the adjustable mounting assembly so that the material flow sensor is angled at an angle to a rotation axis of the auger,
    wherein the mounting post includes:
        a first end coupled to a swivel assembly coupled to a sensor bracket, the swivel assembly configured to rotate the paver material flow sensor about a swivel axis, and
        a second end comprising the mounting slot, the mounting slot being comprised of a plurality of planar surfaces disposed at multiple angles relative to the swivel axis,
        wherein each of the multiple angles for the planar surfaces intersects the swivel axis.

12. The method of claim 11, further comprising sliding a body of the paver material flow sensor in a sensor bracket socket of the sensor bracket of the adjustable mounting assembly toward or away from the auger.

13. The method of claim 12, further comprising clamping the body of the paver material flow sensor in the sensor bracket.

14. The method of claim 11, further comprising pivoting the sensor bracket of the adjustable mounting assembly along a pivot axis where the sensor bracket couples to the swivel assembly coupled to the mounting post.

15. The method of claim 14, wherein tilting the mounting post at the mounting slot on the side plate in a forward or rearward direction comprises tilting the mounting post to a forty-five-degree angle in either the forward or rearward direction relative to a screed extender surface of the paver material feed system.

16. The method of claim 15, wherein adjusting the adjustable mounting assembly so that the material flow sensor is angled at an angle to the rotation axis of the auger comprises adjusting the adjustable mounting assembly to a ninety-degree angle relative to a face of paving material on the screed extender that has exited the auger.

17. An adjustable mounting assembly for a paver material feed sensing system; the adjustable mounting assembly comprising:
  a sensor bracket comprising a socket having an adjustable diameter for receiving a sensor;
  a swivel assembly coupled to the sensor bracket, the swivel assembly configured to rotate the sensor about a swivel axis; and
  a mounting post comprising:
    a first end coupled to the swivel assembly;
    a second end comprising a mounting slot comprising a plurality of planar surfaces disposed at multiple angles relative to the swivel axis,
    wherein each of the multiple angles for the planar surfaces intersects the swivel axis.

18. The adjustable mounting assembly of claim 17, wherein the socket has a smooth inner diameter surface.

19. The adjustable mounting assembly of claim 17, wherein the socket includes a clamp.

20. The adjustable mounting assembly of claim 17, wherein the plurality of planar surfaces includes at least one surface disposed at a forty-five-degree angle relative to the swivel axis.

* * * * *